(12) United States Patent
Matsumoto et al.

(10) Patent No.: US 9,204,134 B2
(45) Date of Patent: Dec. 1, 2015

(54) THREE-DIMENSIONAL DISPLAY DEVICE

(71) Applicant: Japan Display Inc., Tokyo (JP)

(72) Inventors: Shohei Matsumoto, Chiba (JP); Eiji Oohira, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 102 days.

(21) Appl. No.: 13/769,856

(22) Filed: Feb. 19, 2013

(65) Prior Publication Data

US 2013/0222719 A1 Aug. 29, 2013

(30) Foreign Application Priority Data

Feb. 24, 2012 (JP) ................. 2012-038536

(51) Int. Cl.
G02F 1/1335 (2006.01)
H04N 13/04 (2006.01)
G02B 27/22 (2006.01)
G02F 1/1347 (2006.01)
G02F 1/1345 (2006.01)
G02F 1/1333 (2006.01)

(52) U.S. Cl.
CPC ........ H04N 13/0409 (2013.01); G02B 27/2214 (2013.01); G02F 1/1347 (2013.01); H04N 13/0404 (2013.01); G02F 1/13452 (2013.01); G02F 1/133615 (2013.01); G02F 2001/133322 (2013.01); G02F 2001/133354 (2013.01)

(58) Field of Classification Search
CPC .................. G02B 27/2214; H04N 13/0404
USPC .......................................................... 349/15
See application file for complete search history.

(56) References Cited

U.S. PATENT DOCUMENTS

| 5,870,160 A * | 2/1999 | Yanagawa et al. ............ 349/141 |
| 6,307,613 B1 | 10/2001 | Iida |
| 2006/0279687 A1 * | 12/2006 | Park et al. ..................... 349/142 |
| 2007/0215262 A1 * | 9/2007 | Taylor et al. .................... 156/64 |
| 2009/0079894 A1 | 3/2009 | Okuda |
| 2009/0116116 A1 | 5/2009 | Tomikawa et al. |
| 2009/0303427 A1 * | 12/2009 | Kondo et al. ................. 349/153 |
| 2011/0036612 A1 | 2/2011 | Jung et al. |

FOREIGN PATENT DOCUMENTS

| JP | 2004-294862 | 10/2004 |
| JP | 2008-040144 A | 2/2008 |
| JP | 2008-209554 A | 9/2008 |
| JP | 2008-256955 A | 10/2008 |

OTHER PUBLICATIONS

Office Action dated on Mar. 10, 2015 regarding a counterpart Chinese patent application No. 201310063198.3.
Office Action dated May 12, 2015 regarding a counterpart Japanese patent application No. 2012-038536, citing the above reference(s).

* cited by examiner

*Primary Examiner* — Phu Vu
(74) *Attorney, Agent, or Firm* — Lowe Hauptman & Ham, LLP

(57) ABSTRACT

A three-dimensional display device includes an image display panel that has an alignment mark and a parallax formation panel that has an alignment mark and separates a left-eye image and a right-eye image displayed on the image display panel to enable autostereoscopic vision. At least one of the image display panel and the parallax formation panel has a pair of substrates placed on top of each other, and the alignment mark is formed between the pair of substrates.

9 Claims, 7 Drawing Sheets

THREE-DIMENSIONAL DISPLAY DEVICE

CROSS-REFERENCE TO RELATED APPLICATION

The present application claims priority from Japanese application JP2012-38536 filed on Feb. 24, 2012, the content of which is hereby incorporated by reference into this application.

BACKGROUND OF THE INVENTION

1. Field of the Invention

The present invention relates to a three-dimensional display device.

2. Description of the Related Art

In recent years, products that meet the requirements for stereoscopic display of images have been developed, and as small and medium-sized devices such as for a mobile phone or a PDA (Personal digital Assistant), a liquid crystal display device including a parallax barrier liquid crystal panel for viewing without glasses has been known (refer to JP 2004-294862 A).

Alignment between a liquid crystal display panel and the parallax barrier liquid crystal panel is performed using alignment marks disposed on the respective panels. The alignment marks are formed on glass substrates of the respective panels. Therefore, when the liquid crystal display panel and the parallax barrier liquid crystal panel are placed on top of each other, a distance between the alignment marks of the respective panels is increased due to a polarizer or an adhesion layer present therebetween. Therefore, when seeing through a device such as a camera, focus is not achieved and thus an image is blurred in some cases. However, such a situation is avoided through the contrivance of a camera.

However, a resin such as a silicone resin is applied as a protective material to a glass substrate on which a semiconductor chip is mounted. A resin has a transparent color, but when the resin is located on the alignment mark, light is refracted by the surface irregularities, so that the alignment mark appears distorted shapelessly. Therefore, the alignment is difficult. For avoiding this, it is necessary to prevent the resin from adhering to the alignment mark. Alternatively, as the peripheral area (picture-frame) of a display area is narrowed, there arises a problem that an area for putting the alignment mark is not left on a portion of one of the glass substrates, the portion protruding from the other glass substrate.

SUMMARY OF THE INVENTION

It is an object of the invention to provide a three-dimensional display device in which alignment of a plurality of panels can be easily performed without being affected by a protective material and narrowing of a picture-frame.

(1) A three-dimensional display device according to an aspect of the invention includes: an image display panel that has an alignment mark; and a parallax formation panel that has an alignment mark and separates a left-eye image and a right-eye image displayed on the image display panel to enable autostereoscopic vision, wherein at least one of the image display panel and the parallax formation panel has a pair of substrates placed on top of each other, and the alignment mark is formed between the pair of substrates. According to the aspect of the invention, since the alignment mark formed between the pair of substrates is not affected by a protective material and narrowing of a picture-frame, alignment of the plurality of panels can be easily performed.

(2) In the three-dimensional display device according to (1), the image display panel may be a liquid crystal display panel, and have the pair of substrates and a black matrix layer formed on one of the substrates, and a notch as the alignment mark may be formed at a portion of the black matrix layer.

(3) In the three-dimensional display device according to (2), the three-dimensional display device may further include a sealing material that seals a space between the pair of substrates of the image display panel, and the sealing material of the image display panel may overlap with the notch formed in the black matrix layer.

(4) In the three-dimensional display device according to any one of (1) to (3), the parallax formation panel may be a parallax barrier liquid crystal panel and have the pair of substrates.

(5) In the three-dimensional display device according to (4), the three-dimensional display device may further include a sealing material that seals a space between the pair of substrates of the parallax formation panel, and the sealing material of the parallax formation panel may overlap with the alignment mark.

(6) In the three-dimensional display device according to any one of (1) to (5), a polarizer may be bonded to an outer surface of at least one of the pair of substrates so as to avoid an edge portion of the outer surface, and the alignment mark of the image display panel and the alignment mark of the parallax formation panel may be arranged to face the edge portion of the outer surface so as not to overlap with the polarizer.

(7) In the three-dimensional display device according to any one of (1) to (6), the three-dimensional display device may further include a frame that is bonded to one of the image display panel and the parallax formation panel with a light-shielding double-faced tape, and the alignment mark of the image display panel and the alignment mark of the parallax formation panel may be arranged at a position overlapping with the light-shielding double-faced tape.

DETAILED DESCRIPTION OF THE INVENTION

Hereinafter, embodiments of the invention will be described with reference to the drawings.

[First Embodiment]

Figure 1:
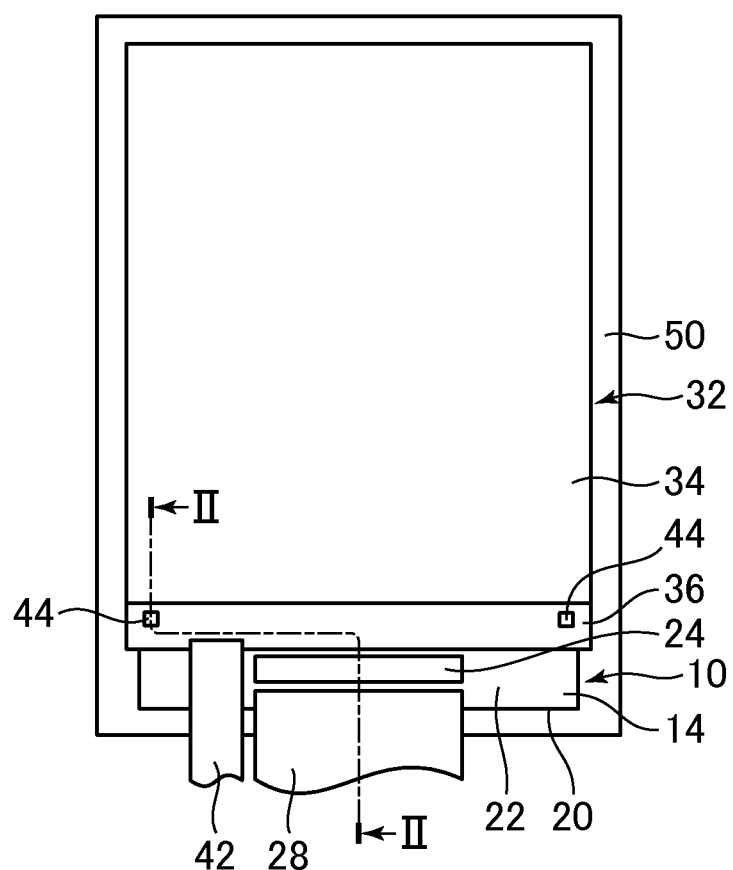
FIG. 1 is a plan view of a three-dimensional display device according to a first embodiment of the invention.
Figure 2:
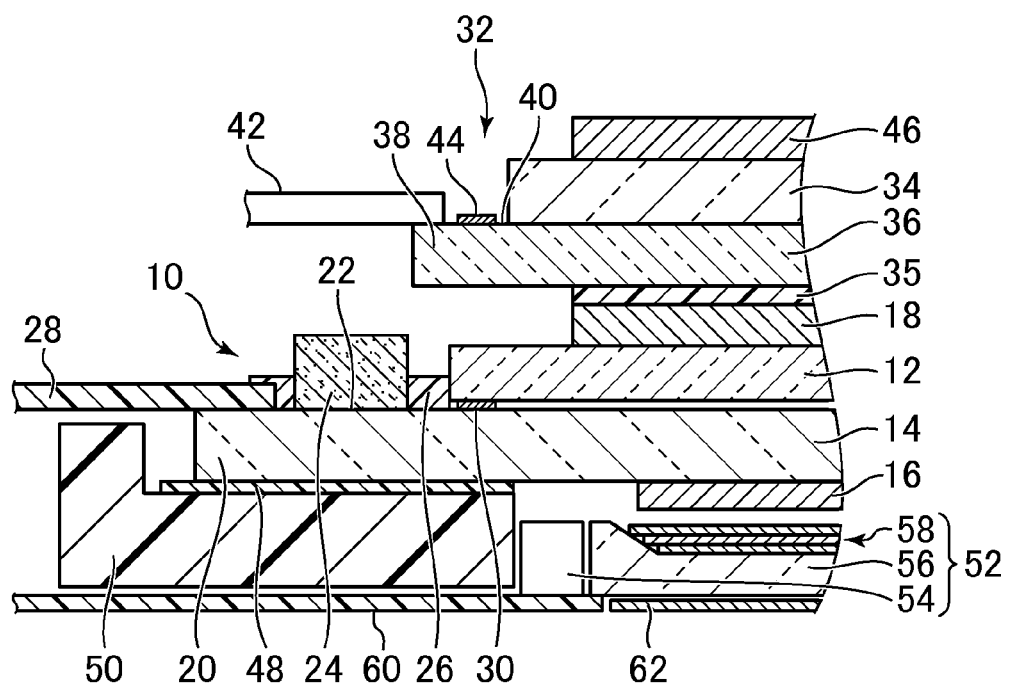
FIG. 2 is a cross-sectional view of the three-dimensional display device shown in FIG. 1, taken along line II-II.

FIG. 1 is a plan view of a three-dimensional display device according to a first embodiment of the invention. FIG. 2 is a cross-sectional view of the three-dimensional display device shown in FIG. 1, taken along line II-II.

The three-dimensional display device has an image display panel 10. The image display panel 10 is a liquid crystal display panel. The liquid crystal display panel may be a panel of the TN (Twisted Nematic) type, the STN (Super Twisted Nematic) type, the VA (Vertical Alignment) system, the IPS (In-Plane Switching) system, or the like, and the structure or system of the panel is not limited.

The image display panel 10 has a first upper substrate 12 and a first lower substrate 14 for interposing liquid crystal (not shown) therebetween. The first upper substrate 12 and the first lower substrate 14 are placed on top of each other. Each of the first upper substrate 12 and the first lower substrate 14 is a transparent substrate made of glass or the like. The first lower substrate 14 is a TFT (Thin Film Transistor) substrate, while the first upper substrate 12 is a color filter substrate. Polarizers 18 and 16 are bonded to outer surfaces of the first upper substrate 12 and the first lower substrate 14, respectively, so as to avoid their edge portions.

The first lower substrate 14 has a first protruding portion 20 that is shifted and protrudes from the first upper substrate 12. A semiconductor chip 24 is mounted on a first protruding surface 22 of the first protruding portion 20, the first protruding surface 22 facing the first upper substrate 12 side. The semiconductor chip 24 is an integrated circuit chip and incorporates therein a drive circuit for liquid crystal.

Around the semiconductor chip 24, a protective material 26 (for example, a resin such as a silicone resin) is disposed to cover and thus protect a wiring (not shown) formed on the first lower substrate 14. The protective material 26 is in contact with an edge face of the first upper substrate 12 but disposed to be lower than a top surface of the first upper substrate 12.

A first flexible wiring board 28 is attached to the first protruding surface 22 of the image display panel 10. The first flexible wiring board 28 electrically connects the image display panel 10 with the outside. The first flexible wiring board 28 is also electrically connected with the semiconductor chip 24. The first flexible wiring board 28 is attached closer to an outer edge of the first lower substrate 14 than the semiconductor chip 24.

The image display panel 10 has a first alignment mark 30. The first alignment mark 30 is formed between the first upper substrate 12 and the first lower substrate 14. The first alignment mark 30 may be formed simultaneously with a wiring or an insulating film formed on the first lower substrate 14. For example, the first alignment mark 30 may be formed of the same metal as that of the wiring, or may be formed of ink by printing. The first alignment mark 30 is covered with the first upper substrate 12 and the first lower substrate 14. Since the first alignment mark 30 is not covered with the protective material 26, visual recognition is not affected by the protective material 26.

The first alignment mark 30 is arranged so as not to overlap with the polarizers 16 and 18. The polarizers 18 and 16 are arranged so as to avoid the edge portions of the outer surfaces of the first upper substrate 12 and the first lower substrate 14, and the first alignment mark 30 is arranged to face the edge portions of the outer surfaces of the first upper substrate 12 and the first lower substrate 14.

The three-dimensional display device has a parallax formation panel 32. The parallax formation panel 32 separates a left-eye image and a right-eye image displayed on the image display panel 10 to enable autostereoscopic vision by a parallax barrier system. The parallax barrier system is a system in which a vertically striped filter (parallax barrier) is placed on a display surface of an image to thereby allow only a left-eye video to reach the left eye and allow only a right-eye video to reach the right eye. Then, different two-dimensional images are recognized by the human s left and right eyes, and based on the two two-dimensional images, the brain constructs a three-dimensional space. On the image display panel 10, the left-eye image and the right-eye image are displayed.

The parallax formation panel 32 is a liquid crystal panel. The liquid crystal panel may also be a panel of the TN (Twisted Nematic) type, the STN (Super Twisted Nematic) type, the VA (Vertical Alignment) system, the IPS (In-Plane Switching) system, or the like, and the structure or system of the panel is not limited.

The parallax formation panel 32 has a second upper substrate 34 and a second lower substrate 36 for interposing liquid crystal (not shown) therebetween. The second upper substrate 34 and the second lower substrate 36 are placed on top of each other. Each of the second upper substrate 34 and the second lower substrate 36 is a transparent substrate made of glass or the like. The second lower substrate 36 is a circuit substrate on which a circuit is formed, and may be a TFT (Thin Film Transistor) substrate.

Alternatively, the parallax formation panel 32 may be a lenticular lens liquid crystal panel for separating a left-eye image and a right-eye image displayed on the image display panel 10 to enable autostereoscopic vision by a lenticular system. The lenticular lens liquid crystal panel is a panel that forms a lenticular lens with liquid crystal, and disclosed in, for example, WO2007/072289. The forming of a microlens with liquid crystal is disclosed in JP 10-239676 A and JP 2009-48078 A.

The second lower substrate 36 has a second protruding portion 38 that is shifted and protrudes from the second upper substrate 34. A second flexible wiring board 42 is attached to a second protruding surface 40 of the second protruding portion 38, the second protruding surface 40 facing the second upper substrate 34 side. Moreover, a second alignment mark 44 is disposed on the second protruding surface 40. The second alignment mark 44 may be formed simultaneously with a wiring or an insulating film formed on the second upper substrate 34. For example, the second alignment mark 44 may be formed of the same metal as that of the wiring, or may be formed of ink by printing. The second alignment mark 44 is arranged so as to avoid an overlap with the second flexible wiring board 42.

A polarizer 46 and the polarizer 18 are bonded to outer surfaces of the second upper substrate 34 and the second lower substrate 36, respectively, so as to avoid edge portions of the outer surfaces. The second alignment mark 44 is arranged to face the edge portion of the outer surface of the second lower substrate 36 so as not to overlap with the polarizers 46 and 18.

The image display panel 10 and the parallax formation panel 32 are arranged so as to overlap with each other. For example, they are bonded together with an adhesion layer 35 made of an ultraviolet curable resin. Specifically, the adhesion layer 35 is present between the first upper substrate 12 (the polarizer 18) and the second lower substrate 36.

Since the second lower substrate 36 is a light transmissive substrate, the first alignment mark 30 can be visually recognized on the second protruding surface 40 through the second protruding portion 38. When the image display panel 10 and the parallax formation panel 32 are located at a predetermined relative position (a normal position as a finished product), alignment between the image display panel 10 and the parallax formation panel 32 is performed using the first alignment mark 30 appearing on the second protruding surface 40 through the second protruding portion 38 and the second alignment mark 44.

A frame 50 is bonded to the image display panel 10 with a light-shielding double-faced tape 48. The first alignment mark 30 and the second alignment mark 44 are arranged at a position overlapping with the light-shielding double-faced tape 48. Accordingly, when the first alignment mark 30 and the second alignment mark 44 are formed of a material that reflects light, they are visually recognized easily.

A backlight 52 is arranged in the frame 50. The backlight 52 includes a light source 54 such as an LED (Light Emitting Diode), a light guide plate 56, and an optical sheet 58. The light source 54 is mounted on a flexible wiring board 60. A reflective sheet 62 is arranged below the light guide plate 56.

Figure 3:
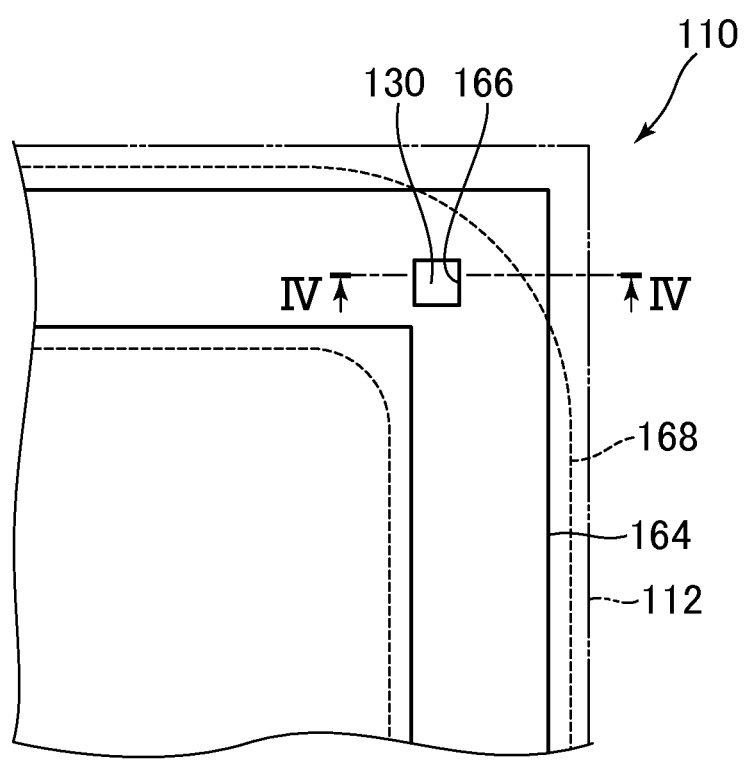
FIG. 3 is a plan view showing a portion of an image display panel in a magnified manner.
Figure 4:
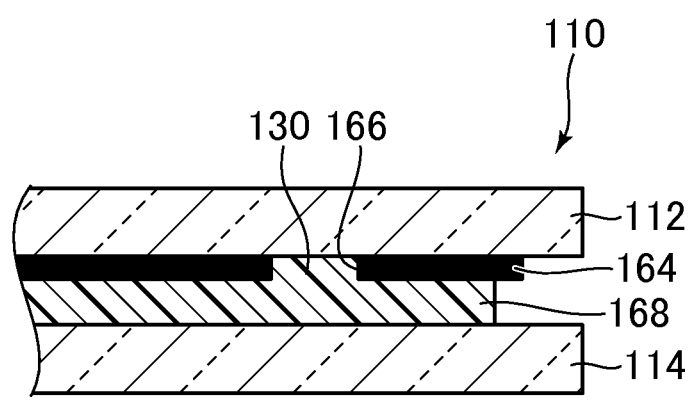
FIG. 4 is a cross-sectional view of the image display panel shown in FIG. 3, taken along line IV-IV.

FIG. 3 is a plan view showing a modified example of an image display panel. FIG. 4 is a cross-sectional view of the image display panel shown in FIG. 3, taken along line IV-IV. An image display panel 110 has a black matrix layer 164 formed on a first upper substrate 112. A notch 166 as a first alignment mark 130 is formed at a portion of the black matrix layer 164. That is, the first alignment mark 130 is a portion that transmits light, and its surrounding portion does not transmit light, so that the first alignment mark 130 is visually recognized.

Between the first upper substrate 112 and a first lower substrate 114, a sealing material 168 that seals a space filled with liquid crystal is disposed. The sealing material 168 overlaps with the notch 166 formed in the black matrix layer 164. It is preferable that the sealing material 168 has a light transmission property and is transparent.

[Second Embodiment]

Figure 5:
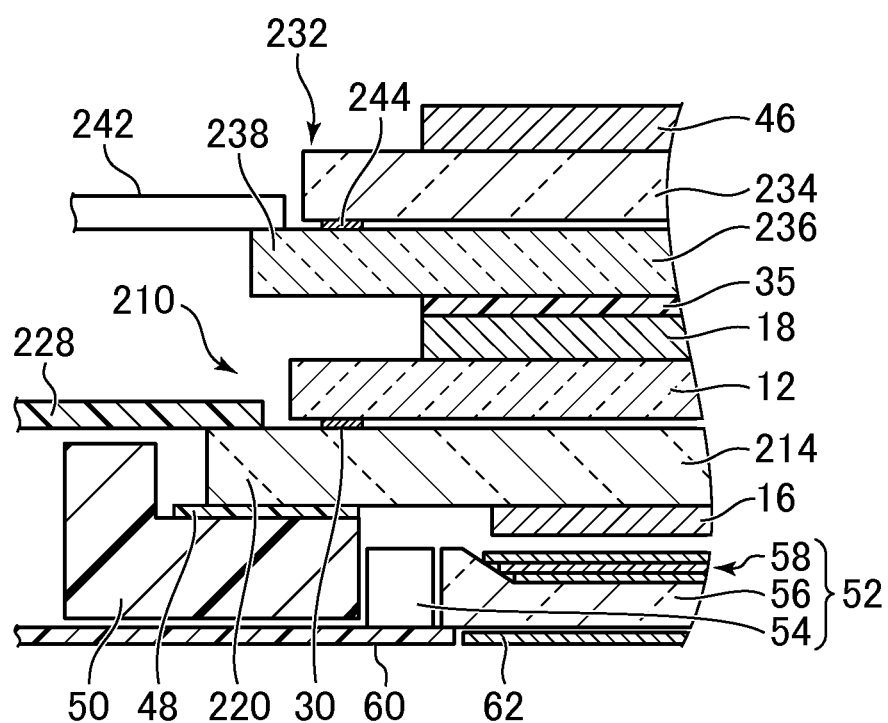
FIG. 5 is a cross-sectional view of a three-dimensional display device according to a second embodiment of the invention.

FIG. 5 is a cross-sectional view of a three-dimensional display device according to a second embodiment of the invention. In this example, the protrusion width of a first protruding portion 220 of a first lower substrate 214 of an image display panel 210 is narrowed, and a first flexible wiring board 228 is attached to the first protruding portion 220 but a semiconductor chip is not mounted thereon.

Moreover, the protrusion width of a second protruding portion 238 of a parallax formation panel 232 is also narrowed, and a second flexible wiring board 242 is attached to the second protruding portion 238 but there is no space therein for disposing a second alignment mark 244. Therefore, the second alignment mark 244 is formed between a second upper substrate 234 and a second lower substrate 236.

Figure 6:
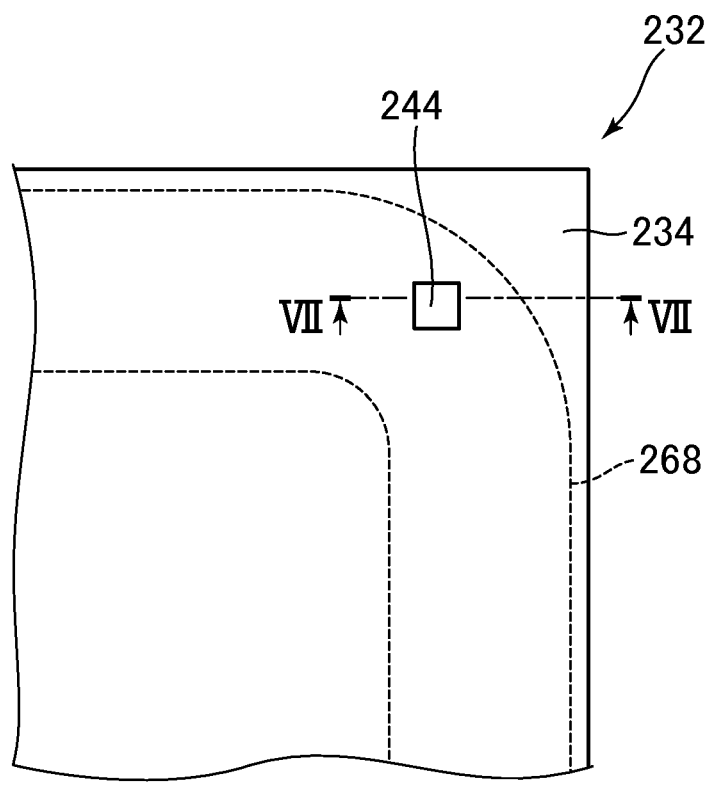
FIG. 6 is a plan view showing a portion of a parallax formation panel in a magnified manner.
Figure 7:
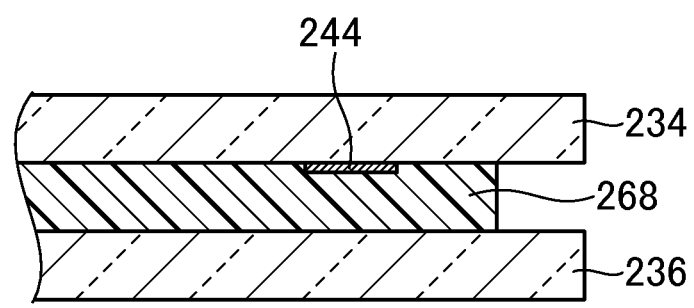
FIG. 7 is a cross-sectional view of the parallax formation panel shown in FIG. 6, taken along line VII-VII.

FIG. 6 is a plan view showing a portion of the parallax formation panel 232 in a magnified manner. FIG. 7 is a cross-sectional view of the parallax formation panel 232 shown in FIG. 6, taken along line VII-VII.

Between the second upper substrate 234 and the second lower substrate 236, a sealing material 268 that seals a space filled with liquid crystal is disposed. The sealing material 268 overlaps with the second alignment mark 244. The second alignment mark 244 preferably has a light-shielding property and is formed of a metal or the like. Moreover, it is preferable that the sealing material 268 has a light transmission property and is transparent.

According to the embodiment, since the second alignment mark 244 is formed between the second upper substrate 234 and the second lower substrate 236, even when a picture-frame is narrowed, alignment between the image display panel 210 and the parallax formation panel 232 can be easily performed. The contents described in the first embodiment apply to other configurations.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A three-dimensional display device comprising:
    an image display panel that has an alignment mark; and
    a parallax formation panel that has an alignment mark and separates a left-eye image and a right-eye image displayed on the image display panel to enable autostereoscopic vision, wherein
    at least one of the image display panel and the parallax formation panel has a pair of substrates placed on top of each other, and the alignment mark is formed between the pair of substrates so as to be visually recognized by light passing through the pair of substrates, wherein the alignment mark appears on the surface of another substrate.

2. The three-dimensional display device according to claim 1, wherein
    the image display panel is a liquid crystal display panel, and has the pair of substrates and a black matrix layer formed on one of the substrates, and
    a notch as the alignment mark is formed at a portion of the black matrix layer.

3. The three-dimensional display device according to claim 2, further comprising a sealing material that seals a space between the pair of substrates of the image display panel, wherein
    the sealing material of the image display panel overlaps with the notch formed in the black matrix layer.

4. The three-dimensional display device according to claim 1, wherein
    the parallax formation panel is a parallax barrier liquid crystal panel and has the pair of substrates.

5. The three-dimensional display device according to claim 4, further comprising a sealing material that seals a space between the pair of substrates of the parallax formation panel, wherein
    the sealing material of the parallax formation panel overlaps with the alignment mark.

6. The three-dimensional display device according to claim 1, wherein
    a polarizer is bonded to an outer surface of at least one of the pair of substrates so as to avoid an edge portion of the outer surface, and
    the alignment mark of the image display panel and the alignment mark of the parallax formation panel are arranged to face the edge portion of the outer surface so as not overlap with the polarizer.

7. The three-dimensional display device according to claim 1, further comprising a frame that is bonded to one of the image display panel and the parallax formation panel with a light-shielding double-faced tape, wherein
    the alignment mark of the image display panel and the alignment mark of the parallax formation panel are arranged at a position overlapping with the light-shielding double-faced tape.

8. The three-dimensional display device according to claim 1, wherein the alignment mark of the image display panel and the alignment mark of the parallax formation panel enable alignment of the image display panel with the parallax formation panel with one another.

9. The three-dimensional display device according to claim 1, wherein the image display panel has the pair of substrates placed on top of each other, and the parallax formation panel has the another substrate.

* * * * *